(12) United States Patent
Yazdy et al.

(10) Patent No.: US 7,852,510 B2
(45) Date of Patent: Dec. 14, 2010

(54) SYSTEMS AND METHODS FOR SETTING CONFIGURING RENDERING PARAMETERS FOR HIGH-SPEED RENDERING DEVICES

(75) Inventors: Mostafa R. Yazdy, Los Angeles, CA (US); Mehrdad Zomorrodi, West Hills, CA (US)

(73) Assignee: Xerox Corporation, Norwalk, CT (US)

( * ) Notice: Subject to any disclaimer, the term of this patent is extended or adjusted under 35 U.S.C. 154(b) by 1630 days.

(21) Appl. No.: 11/117,166

(22) Filed: Apr. 28, 2005

(65) Prior Publication Data

US 2006/0244979 A1 Nov. 2, 2006

(51) Int. Cl.
*G06K 15/12* (2006.01)
(52) U.S. Cl. .................. 358/1.7; 358/3.12; 347/252; 347/253; 347/254
(58) Field of Classification Search .................. 358/1.7, 358/1.9, 1.13, 3.12; 347/252–254
See application file for complete search history.

(56) References Cited

U.S. PATENT DOCUMENTS

| | | | | |
|---|---|---|---|---|
| 4,307,409 A | * | 12/1981 | Greenig et al. | 347/250 |
| 4,366,508 A | * | 12/1982 | Crean et al. | 358/451 |
| 4,853,710 A | * | 8/1989 | Shimada et al. | 347/261 |
| 5,091,971 A | * | 2/1992 | Ward et al. | 382/266 |
| 5,144,337 A | * | 9/1992 | Imamura et al. | 347/252 |
| 5,606,648 A | * | 2/1997 | Walther et al. | 358/1.9 |
| 5,754,218 A | * | 5/1998 | Baek et al. | 347/240 |
| 5,784,094 A | | 7/1998 | Ota et al. | 347/243 |
| 6,031,629 A | | 2/2000 | Shibuya et al. | 358/1.9 |
| 6,243,548 B1 | | 6/2001 | Hebert et al. | 399/79 |
| 6,310,681 B1 | * | 10/2001 | Taniwaki | 355/55 |
| 6,317,848 B1 | | 11/2001 | Sorens et al. | 714/48 |
| 6,470,042 B1 | * | 10/2002 | Tani et al. | 375/132 |
| 6,628,424 B2 | * | 9/2003 | Sakurai | 358/1.9 |
| 6,661,254 B1 | * | 12/2003 | Agrawal et al. | 326/41 |
| 6,700,594 B1 | * | 3/2004 | McCormick et al. | 347/116 |
| 6,765,695 B2 | | 7/2004 | Chen et al. | 358/1.9 |
| 7,382,394 B2 | * | 6/2008 | Niland et al. | 347/249 |
| 7,649,544 B2 | * | 1/2010 | Yazdy | 347/247 |
| 2004/0160642 A1 | * | 8/2004 | Muramatsu | 358/3.01 |
| 2005/0036028 A1 | * | 2/2005 | Yoshida | 347/238 |

* cited by examiner

*Primary Examiner*—Twyler L Haskins
*Assistant Examiner*—Dennis Dicker
(74) *Attorney, Agent, or Firm*—Kermit D. Lopez; Luis M. Ortiz; Tuesday A. Kaasch

(57) ABSTRACT

Data-processing systems and methods include a rendering device which renders documents based upon the timing and duration of a laser beam associated with particular pixel data. Additionally, a controlling mechanism for controlling and adjusting the particular pixel data can be provided, wherein the controlling mechanism is subject to pixel clock signal in order to optimize a performance of the rendering device under varying rendering parameters and thereby enhance the quality of data rendered via the rendering device. Such a controlling mechanism can be implemented as a programmable phase locked loop circuit to which a pixel clock signal and a frequency are applied in order to provide at least one output signal for controlling the laser beam.

10 Claims, 3 Drawing Sheets

SYSTEMS AND METHODS FOR SETTING CONFIGURING RENDERING PARAMETERS FOR HIGH-SPEED RENDERING DEVICES

TECHNICAL FIELD

Embodiments are generally related to data-processing methods and systems. Embodiments are also related rendering devices, such as printers, scanners, multi-function devices, photocopy machines, and the like. Embodiments are particularly related to high-speed color laser printers and techniques for adjusting printing parameters thereof.

BACKGROUND OF THE INVENTION

Conventional rendering devices such as copiers, scanners, and laser printers, (both color and black & white) are widely used as output devices in home and office computers. Such rendering devices are particularly popular in computing environments where relatively high speed is desired. In addition to the demand for high speed, there is also a growing demand for higher quality rendering and printing. However, since these characteristics are generally inversely related, higher quality comes at the expense of slower throughput. That is, the more intensive processing required to produce a higher quality output slows the rendering output rate.

In conventional laser printer systems, for example, an image processing unit can accept input from a printer driver and generates pulse wave modulated (PWM) video data to drive the laser engine. In such systems, the graphics objects are typically first rendered into 24 bits/pixel RGB data and 8 bits/pixel in an X field, where R, G and B respectively represent red, green and blue color intensities and X indicates whether the pixel is a text, graphics or image pixel. Raster operation processing (ROP) instructions are then performed in 24-bit RGB color space. The ROP codes define how the graphics device interface (GDI) combines the bits from the selected pen with the bits in the destination map.

The RGBX data can then be converted into CMYKX data and written to memory in compressed format. At higher output resolutions (e.g., 600 dpi and up) this processing is quite time consuming on conventional systems and tends to create a bottleneck in the processing pipeline. The post-decompression operations provided by color resolution improvement technology (CRIT) and color photo graphic improvement (CPGI), which are used to generate PWM-formatted signals also slow considerably at higher output resolutions.

In order to achiever higher rendering speeds and output, it is sometimes necessary when configuring and designing rendering devices to implement sub-system architecture for image enhancement algorithms for sub-pixel generation. In order to enhance the quality of images rendered by high-speed rendering devices, such as color laser printers or copiers, it is necessary to control the size of the pixels. This can be accomplished by altering the timing and the duration of the laser beam for each particular pixel. Traditionally, the hardware which implements such algorithms utilizes pulse width position modulation. For high speed printers, however current electronics technology limits the speed. Therefore, it is believed that a particular method for implementing the procedure in order to control the degree of further adjustments to optimize the performance under different printing parameters, such as pixel clock frequencies, number of pixels, printing speed and so forth is needed.

BRIEF SUMMARY

It is a feature of the present invention to provide improved data-processing methods and systems.

It is also a feature of the present invention to provide improved methods and systems for configuring rendering devices, such as printers, scanners, multi-function devices, photocopy machines, and the like.

It is also a feature of the present invention to provide for methods and systems for controlling rendering (e.g., printing) parameters of high-speed rendering devices, such as color laser printers.

Aspects of the present invention relate to data-processing systems and methods and include a rendering device which renders documents based upon the timing and duration of a laser beam associated with particular pixel data. Additionally, a controlling mechanism for controlling and adjusting the particular pixel data can be provided, wherein the controlling mechanism is subject to pixel clock signal in order to optimize a performance of the rendering device under varying rendering parameters and thereby enhance the quality of data rendered via the rendering device. Such a controlling mechanism can be implemented as a programmable phase locked loop circuit to which a pixel clock signal and a frequency-adjusted signal are applied in order to provide at least one output signal for controlling the laser beam.

Additionally, one or more parallel-to-serial converter circuits can be associated with the controlling mechanism, wherein video data is applied to the one or more parallel-to serial converters in order to generate an output signal thereof and wherein at least clock signal is applied to the at least one parallel-to-serial converter, such that the at least one clock signal is faster than the pixel clock signal in order to control a maximum duration of the output signal. Note that the output signal generated by the parallel-to-serial converter circuit can comprise the particular sub-pixel data.

Also, one or more override circuits can be provided, which are coupled to the parallel-to-serial converter circuit(s) for activating or de-activating the output signal generated by the one or more parallel-to-serial converter circuits. A delay signal can be utilized for initializing the video data, and the particular sub-pixel data can be generated in the form of a plurality of pulses having a width thereof that activate the duration of the laser beam. The video data can be provided to the one or more parallel-to-serial converters in a parallel format of N-bit signals, wherein N represents a number of sub-pixels. The number of sub-pixels can be selected by a control signal.

BRIEF DESCRIPTION OF THE DRAWINGS

The particular values and configurations discussed in these non-limiting examples can be varied and are cited merely to illustrate one or more embodiments and are not intended to limit the scope thereof.

DETAILED DESCRIPTION OF THE INVENTION

The particular values and configurations discussed in these non-limiting examples can be varied and are cited merely to illustrate embodiments and are not intended to limit the scope of the embodiments.

Figure 1:
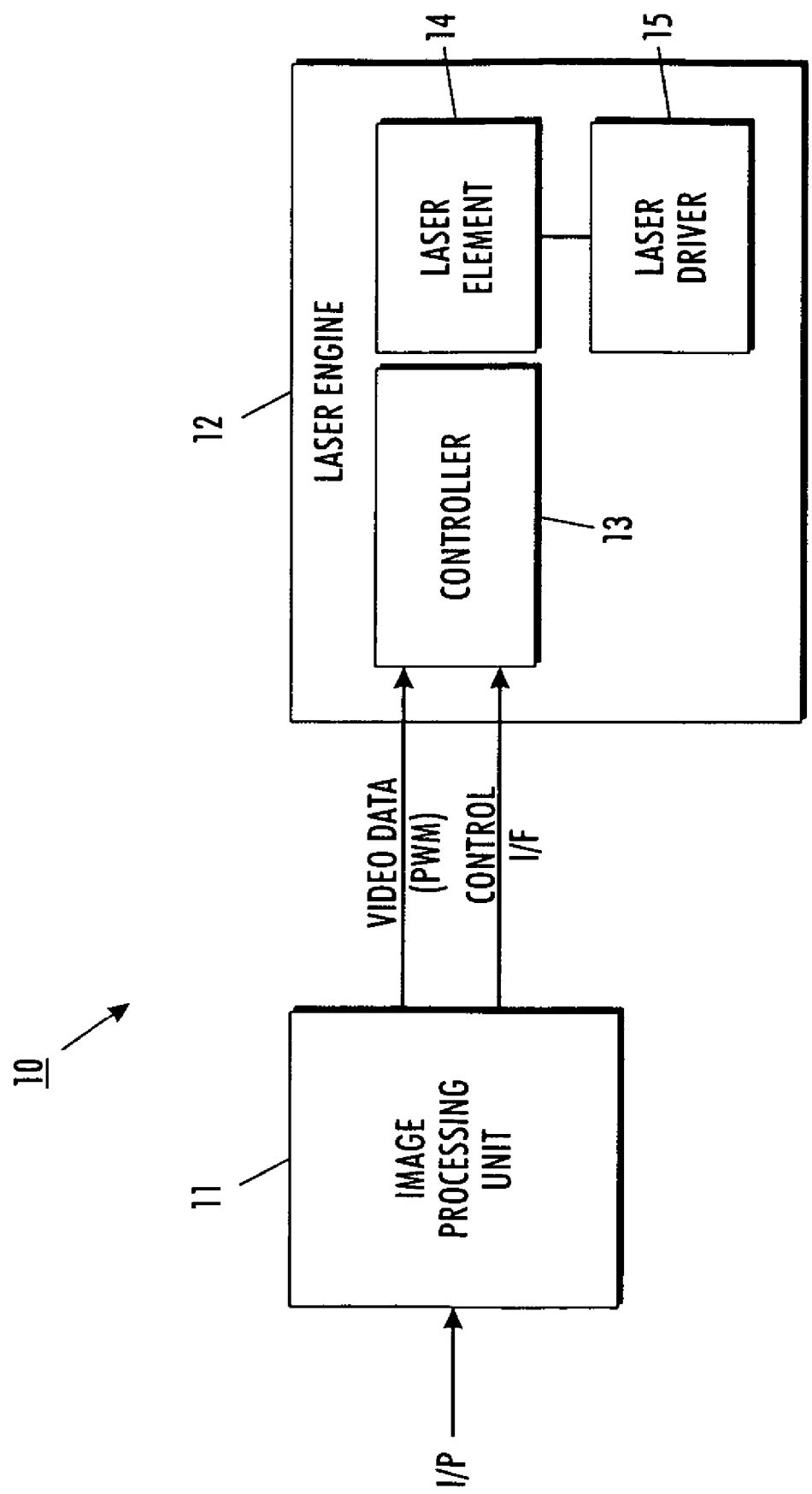
FIG. 1 illustrates a rendering device, which may be adapted for use in accordance with one embodiment.

FIG. 1 illustrates a rendering device 10, which may be adapted for use in accordance with one embodiment. Rendering device 10 generally includes an image processing unit 11 and a laser engine 12. Referring to FIG. 1, the relationship between an image processing unit 11 and a laser printer engine 12 is illustrated. Image processing unit 11 receives an input signal (I/P) from a printer driver (not shown) and can generate a pulse wave modulated (PWM) formatted video data to drive a laser printer engine 12 according to a control interface (I/F) signal transmitted from the unit 11 to engine 12. Note that the laser printer engine can optionally include a laser driver 15, which in turn is associated with laser element 14. Laser driver 15 can be responsive to pixel data, which can be utilized to active laser beams from laser element 14, depending upon design considerations. Optionally, laser driver 15 can be associated or responsive to pulse wave modulated (PWM) formatted video data in order to drive laser element 14 and generate and control a resulting laser beam thereof.

Image processing unit 11 may be implemented with appropriate software modules, or by hardware components such as ASICs, a programmable logic device (PLD), field programmable logic device, and so forth. As depicted in FIG. 1, laser printer engine 12 includes a controller 13 and a laser element 14. Note that rendering device 10 can be implemented as an ink jet printer (i.e., color and/or black and white), a copy machine, a scanning device, and/or a combination thereof. Rendering device 12 can also be implemented in the context of a multi-function copy machine and scanner. Note that in FIG. 1, rendering device 10 merely illustrative of one embodiment.

Figure 2:
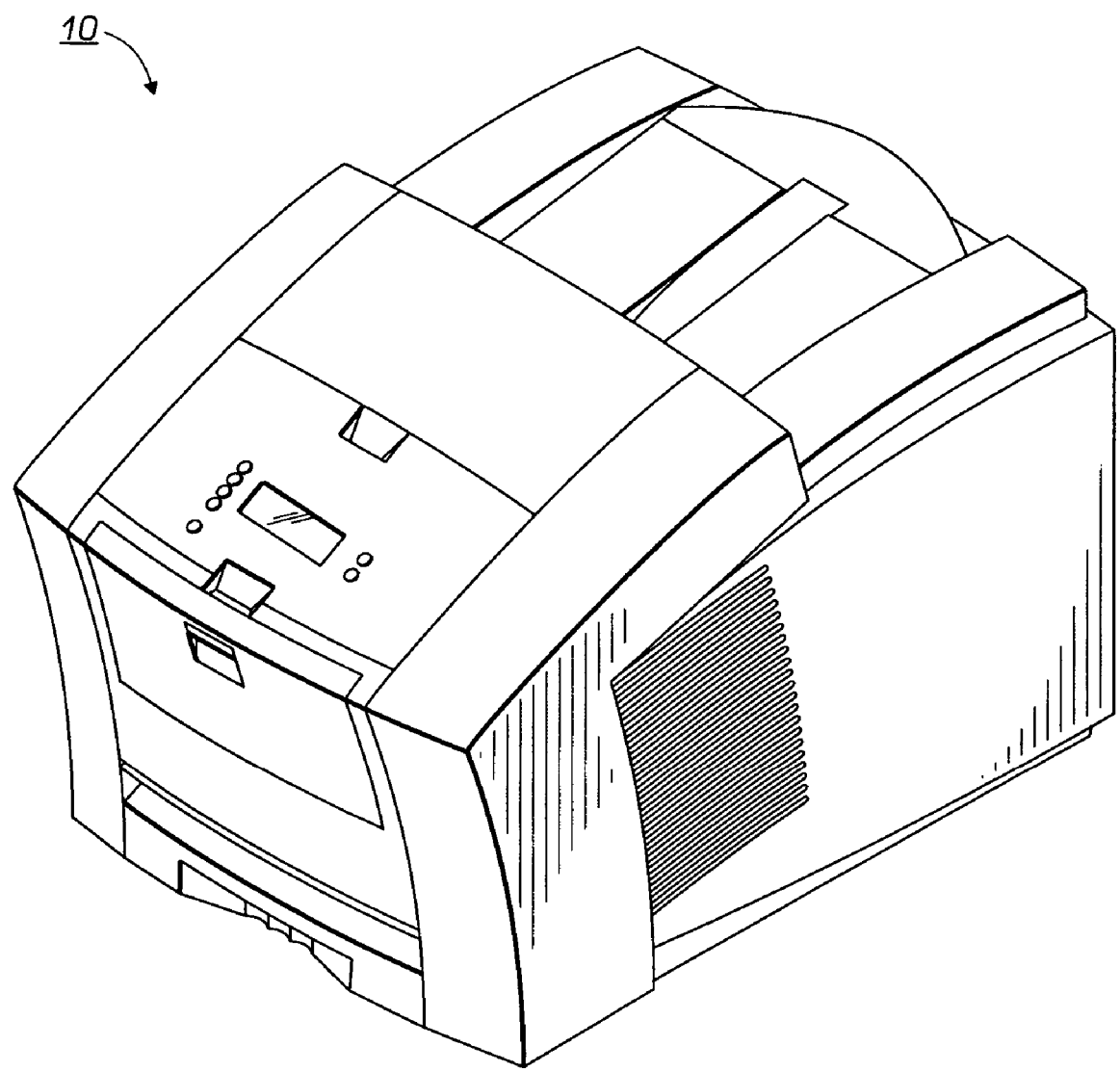
FIG. 2 illustrates an alternative embodiment for the implementing rendering device depicted in FIG. 1.

FIG. 2 illustrates an alternative embodiment of rendering device 10, which can be implemented as a laser printer that takes advantage of a laser beam to produce an image on a drum. Laser engine 12 can produce such a laser beam. The light of the laser alters the electrical charge on the drum wherever it hits. The drum can be then rolled through a reservoir of toner, which is picked up by the charged portions of the drum. Finally, the toner is transferred to the paper through a combination of heat and pressure. Rendering device 10 can thus be implemented as any number of printing or graphical rendering devices and is illustrative merely to depict one possible embodiment in which the systems and methods disclosed herein can be implemented.

Figure 3:
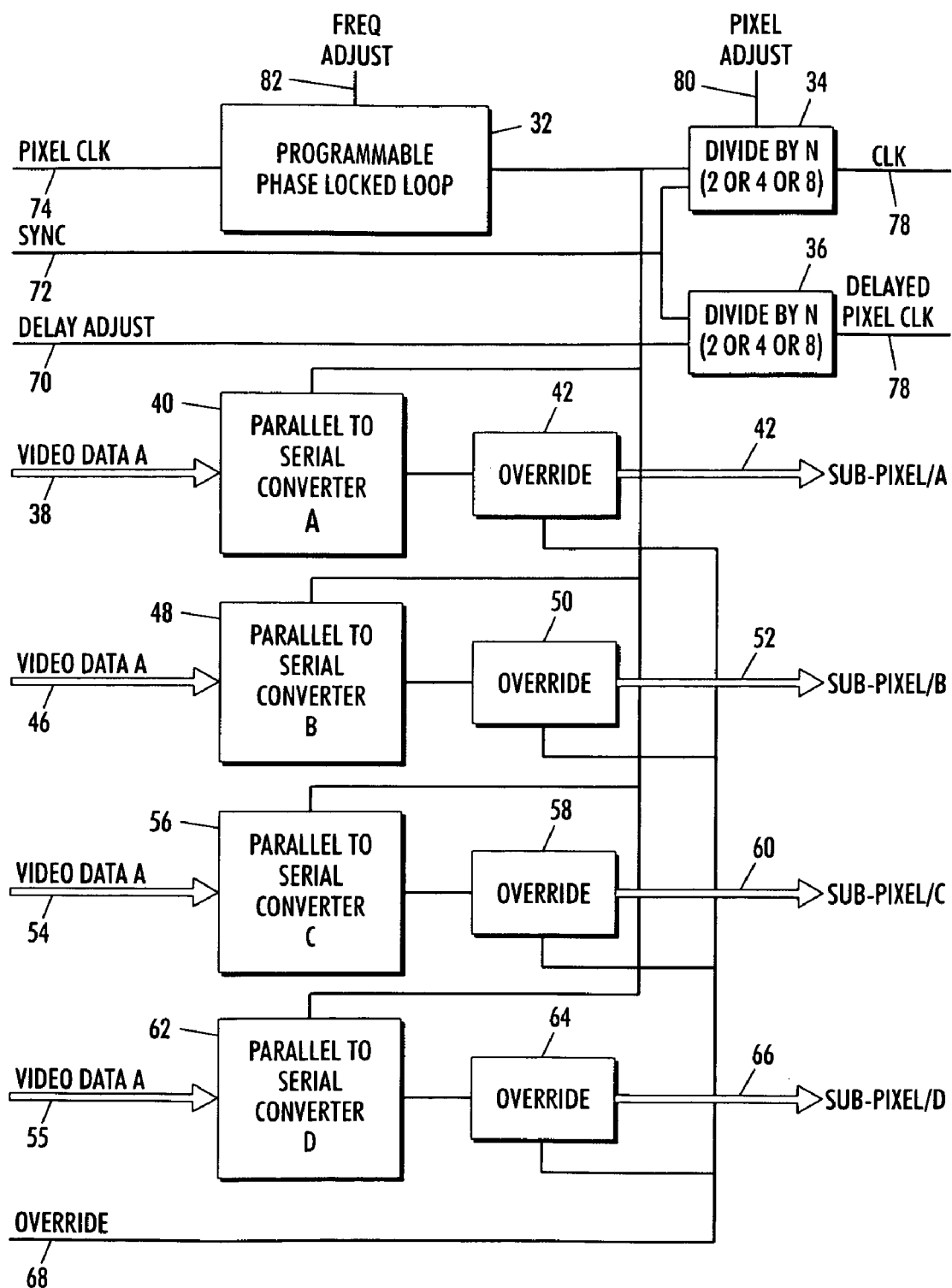
FIG. 3 illustrates a data-processing system, which can be implemented in accordance with a preferred embodiment.

FIG. 3 illustrates a data-processing system 30, which can be implemented in accordance with a preferred embodiment. System 30 generally includes a programmable phase locked loop circuit 32 to which a pixel clock signal (Pixel CLK) 74 can be input. A pin 82 for adjusting the frequency of the pixel clock signal 74 can also be provided in association with the programmable phase locked loop circuit 32. One or more parallel-to-serial converters 40, 48, 56 and 62 are also provided as a part of system 30 and are associated with the programmable phase locked loop circuit 32. Output from the programmable phase locked loop circuit 32 can also be provided to a dividing circuit 34, which is subject to a control signal 80.

Dividing circuit 34 provides an output clock signal 76. A delay circuit 36 is associated with dividing circuit 34 and produces a delayed pixel clock signal 78. Note that the programmable phase locked loop circuit 32 functions generally as a controlling mechanism that controls and adjusts particular pixel data, wherein the controlling mechanism is subject to one or more pixel clock signals in order to optimize the performance of a rendering device (e.g., rendering device 10) under varying rendering parameters and thereby enhance the quality of data rendered via such a rendering device.

Parallel-to-serial converter 40 (i.e., parallel-to-serial converter A) receives as input, video data 38 (i.e., video data A). Output from parallel-to-serial converter 40 is provided to an override circuit 42, which in turn provides output data in the form of a sub-pixel 44 (i.e., sub-pixel A). Similarly, parallel-to-serial converter 48 (i.e., parallel-to-serial converter B) receives as input, video data 46 (i.e., video data B). Output from parallel-to-serial converter 48 can be provided to an override circuit 50, which in turn provides output data in the form of a sub-pixel 52 (i.e., sub-pixel B).

Additionally, parallel-to-serial converter 56 (i.e., parallel-to-serial converter C) receives as input, video data 54 (i.e., video data C). Output from parallel-to-serial converter 56 is provided to an override circuit 58, which in turn can provide output data in the form of a sub-pixel 60 (i.e., sub-pixel C). Finally, parallel-to-serial converter 62 (i.e., parallel-to-serial converter D) receives as input, video data 55 (i.e., video data D). Output from parallel-to-serial converter 62 is provided to an override circuit 64, which in turn provides output data in the form of a sub-pixel 66 (i.e., sub-pixel D).

As depicted in FIG. 3, N-bit signals are provided in parallel format as "video data", specifically, video data A and video data B for a dual channel ROS system, and video data A, video data B, video data C, and video data D for a quad-channel ROS system. Such video can be applied to the parallel-to-serial converter circuits 40, 48, 56, and 62, which respectively generate the output signals sub-pixel A, sub-pixel B, sub-pixel C, and sub-pixel D, which are typically output in the form of pulses. Such signals can be applied to a laser drive, such as, for example, laser driver 15 depicted in FIG. 1 in the ROS in order to turn on the laser beams of the laser element 14.

The duration of the laser beam in each ON state depends on the width of these output pulses (i.e., sub-pixel A, sub-pixel B, sub-pixel C, and sub-pixel D). Note that regarding the value N in the N-bit, N represents the number of sub-pixels and can be selected via a control signal 80, also referred to as "Pixel Adjust" signal, such that there is no need to for a new hardware for each case and the same hardware can be utilized for different applications.

The parallel-to-serial converter circuits 40, 48, 56, and 62 require an internal clock signal that is N times faster than the pixel clock signal 74, which controls the maximum duration of output pulses sub-pixels 44, 52, 60, and 66. The internal clock of parallel-to-serial converter circuits 40, 48, 56, and 62 can be referred to as a "sub-pixel clock" and is generated the phase locked loop circuit 32. The internal design of the phase locked loop circuit 32 can be optimized for a particular frequency, as indicated by pin 82, which provides for a frequency adjustment signal. If the frequency of the pixel clock signal 74 provided to phase locked loop circuit 32 is altered, some important parameters such as the setting time and the jitter will be affected. In order to use the same hardware for different applications, the performance of the phase locked loop circuit 32 can be optimized using another control signal at pin 82 (i.e., a frequency adjust signal).

Depending on the input data provided by the various video data signals 38, 46, 54, and 55, the width of the output pulses of sub-pixels 44, 52, 60, and 66 can be adjusted between 0/N and 8/N of the maximum width, which is determined by the pixel clock signal 74. For example, if the pixel clock signal 74 is 50 Mhz (i.e., 20 ns period), the number of pixels is 8 and the input "video data" is "11111111" and the output pulses would have a duration of 20 ns (8/8). Similarly, if the input data is "00000001", the output pulse will have a duration of 2.5 ns (1/8) at the end, and so forth. If the "pixel clock" is 75 Mhz (13.33 ns period), and the number of pixels is 4 and the input "video data" is "1111", then the output pulse would have a 13.33 ns duration (4/4). If the input data is "0001", the output pulse will have a duration of 3.33 ns (1/4) at the end and so forth.

The override functions of override circuits 42, 50, 58, and 60 can be utilized to move the output pulses into an "ON" or "OFF" state regardless of the input data. Also, a "delay" function provided by the delay circuit 36 regenerates the delayed pixel clock signal 78 (i.e., delayed with respect to the pixel clock signal 76) by a factor of ⅛ to ⅝. The delayed pixel clock signal 78 can be utilized in system 30 to control the start of video data streams thereof.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention what is claimed is:

1. A data-processing system, comprising:
    a rendering device which renders documents based upon the timing and duration of a laser beam associated with particular pixel data;
    a laser driver that is responsive to said pixel data in order to activate said laser beam from a laser element;
    a controlling mechanism for controlling and adjusting said particular pixel data, wherein said controlling mechanism is subject to pixel clock signal in order to optimize a performance of said rendering device under varying rendering parameters and thereby enhance the quality of data rendered via said rendering device, wherein said controlling mechanism comprises a programmable phase locked loop circuit to which a pixel clock signal and a frequency of said pixel clock signal are applied in order to generate at least one output signal for controlling said laser beam;
    a pin associated with said controlling mechanism and for adjusting said frequency of said pixel clock signal;
    a dividing circuit for receiving said output signal from said programmable phase locked loop circuit to produce an output clock signal;
    a delay circuit for producing a delayed pixel clock signal wherein said delay circuit is associated with, and communicates electronically with, said dividing circuit;
    at least one parallel-to-serial converter circuit associated with said controlling mechanism, wherein video data is applied to said at least one parallel-to serial converter in order to generate an output signal thereof and wherein at least clock signal is applied to said at least one parallel-to-serial converter, such that said at least one clock signal is faster than said pixel clock signal in order to control a maximum duration of said output signal; and
    a plurality of override circuits coupled to said at least one parallel-to-serial converter circuit for outputting data in the form of sub-pixel data.

2. The system of claim 1 further comprising a delay signal for initializing said video data.

3. The system of claim 1 wherein said sub-pixel data comprises a plurality of pulses having a width thereof that activate a duration of said laser beam.

4. The system of claim 1 wherein video data is provided to said at least one parallel-to-serial converter in a parallel format of N-bit signals, wherein N represents a number of sub-pixels.

5. The system of claim 4 wherein said sub-pixels are selected by a control signal.

6. A data-processing system, comprising:
    a rendering device which renders documents based upon the timing and duration of a laser beam associated with particular pixel data;
    a laser driver that is responsive to said pixel data in order to activate said laser beam from a laser element;
    a programmable phase locked loop circuit for controlling and adjusting said particular pixel data, wherein said programmable phase locked loop circuit is subject to a pixel clock signal in order to optimize a performance of said rendering device under varying rendering parameters and thereby enhance the quality of data rendered via said rendering device and wherein a pixel clock signal and a frequency of said pixel clock signal are applied to said programmable phase locked loop circuit in order to generate at least one output signal for controlling said laser beam;
    a pin associated with said phase locked loop circuit and for adjusting said frequency of said pixel clock signal;
    a dividing circuit for receiving said output signal from said programmable phase locked loop circuit to produce an output clock signal;
    a delay circuit for producing a delayed pixel clock signal wherein said delay circuit is associated with, and communicates electronically with, said dividing circuit;
    at least one parallel-to-serial converter circuit associated with said controlling mechanism, wherein video data is applied to said at least one parallel-to serial converter in order to generate an output signal thereof and wherein at least clock signal is applied to said at least one parallel-to-serial converter, such that said at least one clock signal is faster than said pixel clock signal in order to control a maximum duration of said output signal; and
    a plurality of override circuits coupled to said at least one parallel-to-serial converter circuit for outputting data in the form of a sub-pixel data.

7. The system of claim 6 further comprising a delay signal for initializing said video data and wherein said sub-pixel data comprises a plurality of pulses having a width thereof that activate a duration of said laser beam.

8. The system of claim 6 wherein video data is provided to said at least one parallel-to-serial converter in a parallel format of N-bit signals, wherein N represents a number of sub-pixels.

9. A data-processing method, comprising:
    providing a rendering device which renders documents based upon the timing and duration of a laser beam associated with particular pixel data;
    providing a laser driver that is responsive to said pixel data in order to activate said laser beam from a laser element;
    controlling and adjusting said particular pixel data utilizing a controlling mechanism, wherein said controlling mechanism is subject to a pixel clock signal in order to optimize a performance of said rendering device under varying rendering parameters and thereby enhance the quality of data rendered via said rendering device, wherein said controlling mechanism comprises a programmable phase locked loop circuit to which a pixel clock signal and a frequency of said pixel clock signal are applied in order to generate at least one output signal for controlling said laser beam;

providing a pin associated with said phase locked loop circuit and for adjusting said frequency of said pixel clock signal;

providing a dividing circuit for receiving said output signal from said programmable phase locked loop circuit to produce an output clock signal;

providing a delay circuit for producing a delayed pixel clock signal wherein said delay circuit is associated with, and communicates electronically with, said dividing circuit;

associating at least one parallel-to-serial converter circuit with said controlling mechanism;

applying video data to said at least one parallel-to serial converter in order to generate an output signal thereof and wherein at least clock signal is applied to said at least one parallel-to-serial converter, such that said at least one clock signal is faster than said pixel clock signal in order to control a maximum duration of said output signal;

connecting a plurality of override circuits to said at least one parallel-to-serial converter circuit for outputting sub-pixel data; and providing a delay signal for initializing said video data, wherein said sub-pixel data comprises a plurality of pulses having a width thereof that activate a duration of said laser beam.

10. The method of claim 9 further comprising:

providing video data to said at least one parallel-to-serial converter in a parallel format of N-bit signals, wherein N represents a number of sub-pixels, wherein said sub-pixels are selected by a control signal.

* * * * *